United States Patent [19]
Zimmer

[11] Patent Number: 4,700,911
[45] Date of Patent: Oct. 20, 1987

[54] TRANSVERSE DRIVING BODIES, PARTICULARLY AIRPLANE WINGS

[75] Inventor: Herbert Zimmer, Friedrichshafen, Fed. Rep. of Germany

[73] Assignee: Dornier GmbH, Friedrichshafen, Fed. Rep. of Germany

[21] Appl. No.: 665,443

[22] Filed: Jan. 22, 1985

Related U.S. Application Data

[63] Continuation of Ser. No. 347,222, Feb. 9, 1982, abandoned, which is a continuation of Ser. No. 116,562, Jan. 29, 1980, abandoned.

[51] Int. Cl.$^4$ ............................................. B64C 3/10
[52] U.S. Cl. ................................... 244/35 R; 244/45 R
[58] Field of Search ................... 244/198, 34 R, 35 R, 244/35 A, 45 R, 200

[56] References Cited

U.S. PATENT DOCUMENTS

| | | | |
|---|---|---|---|
| 1,337,515 | 4/1920 | Holle | 244/35 R |
| 1,421,934 | 7/1922 | Gary | 244/35 R |
| 1,547,644 | 7/1925 | Crowst et al. | 244/35 R |
| 1,817,275 | 8/1931 | Soldenhoff | 244/35 R |
| 2,441,758 | 5/1948 | Garbel | 244/35 R |
| 2,609,055 | 9/1952 | Monroe | 244/35 R |
| 2,643,076 | 6/1953 | Hurel | 244/35 R |
| 2,709,052 | 5/1955 | Berg | 244/35 R |

OTHER PUBLICATIONS

"Jane's All the World Aircraft" 1977–78 p. 248.

Primary Examiner—Galen Barefoot
Attorney, Agent, or Firm—Ralf H. Siegemund

[57] ABSTRACT

This invention relates to a transverse driving body, particularly an aircraft wing, the wing comprising a wing tip extending basic parts of the wing in the span direction for the purpose of increasing the aspect ratio, the wing tip being of triangular design with a sweptback leading edge, and the profile camber of each of the wing tip increasing at least over a portion of the extension thereof from a basic wing part to the wing tip.

4 Claims, 3 Drawing Figures

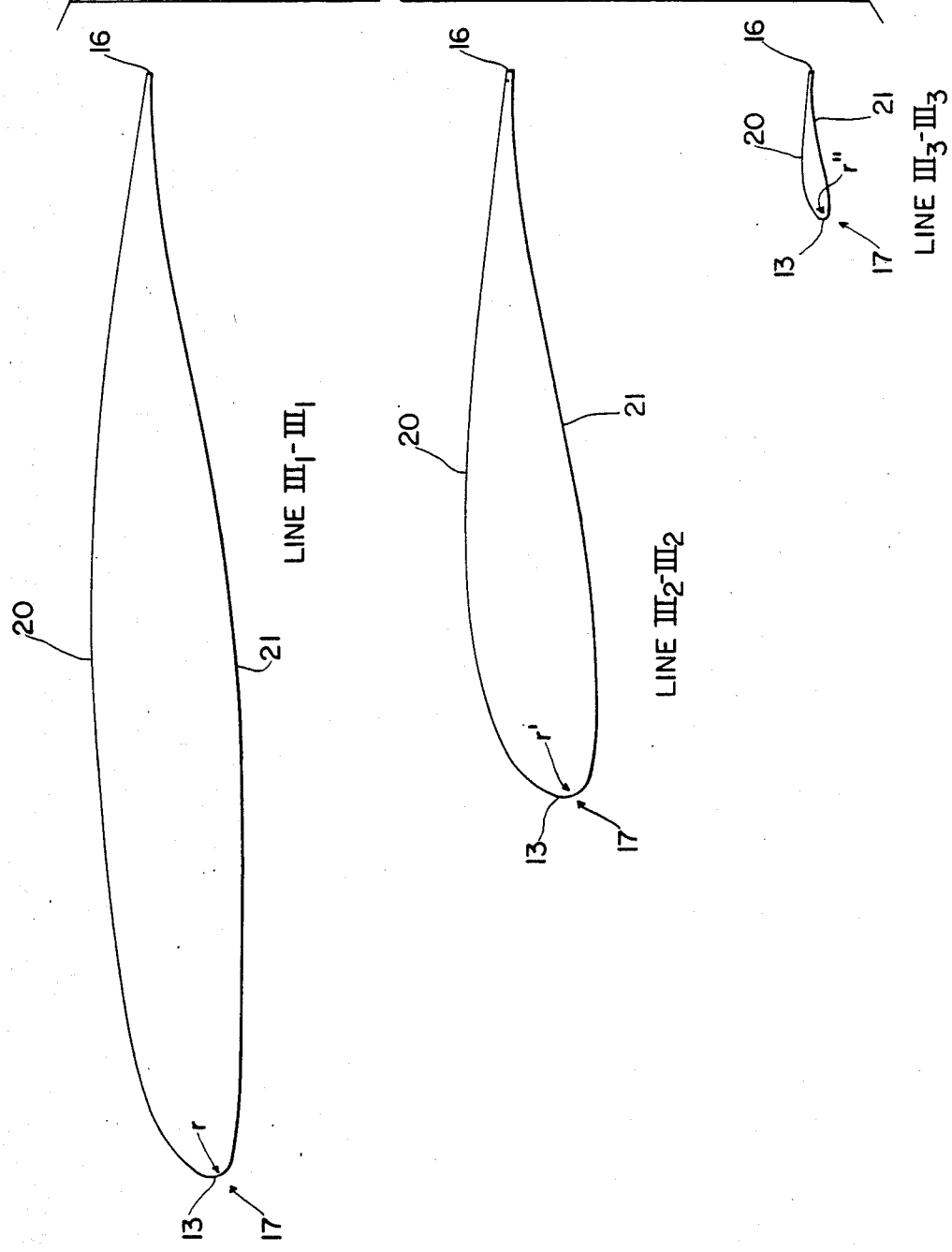

TRANSVERSE DRIVING BODIES, PARTICULARLY AIRPLANE WINGS

This is a continuation application, of application Ser. No. 347,222, filed Feb. 9, 1982, which in turn was a continuation of application Ser. No. 116,562, filed Jan. 29, 1980, both are now abandoned.

This invention concerns transverse driving bodies, particularly airplane wings.

Efforts are widely being made at present in the field of aviation, to improve the economy of aircraft on account of rising fuel costs. One way of achieving this is to decrease the drag. The term "aircraft drag" comprises a number of various causes. One of these is, for instance, the surface friction in general. Other factors are interference drag, profile drag or also the lift-dependent induced drag which is the basis of the invention.

The performance of civil aviation aircraft, for instance rate of climb and range, can be improved by using aircraft wings of larger span or aspect ratio. However a substantial problem is encountered in that increasing the aspect ratio also appreciably increases the wing weight, whereby the advantages are cancelled again. As regards wings with conventional edges along the direction of flow, increasing the aspect ratio as a first approximation results in an increase in weight proportional to the increase in the aspect ratio (proportional to the square of the increase in span).

The object of the present invention is an improvement in aircraft performance by design measures at the wing for the purpose of reducing the lift-dependent drag by means of an enlarged wing aspect ratio for a much reduced increase in weight. The problem is solved by the invention in that the aircraft wing comprises a wing tip part extending the basic wing parts in the direction of the span for the purpose of increasing the aspect ratio, in that the wing tip parts are triangular with a sweptback leading edge, and in that the profile camber of the wing tip parts increases from the basic wing part to the wing tip at least over part of its size. The profiles of the wing tip parts are of such a design that their local direction of zero lift does not vary with respect to the end of the basic wing part.

This design of the invention for aircraft wings achieves that for a given lift, the total drag for equal wing load is considerably lessened with respect to wings with conventional wing tips. While the increase in aspect ratio also results in an undesired increase in wing weight, it is however substantially less compared with conventionally designed wing tip parts. The advantage so achieved is due to the special design of the wing tip part causing a change in the distribution of lift across the entire wing span. This change essentially resides in a shallower decrease of the curve of the lift distribution toward the wing tips. As a result, there is a lesser root flexural moment than in conventional wings of the same aspect ratio due to the lighter structure of the overall wing. The increase in the local lift coefficient due to the sweepback of the invention in the leading edge at the wing tip part and the resulting premature flow separation from the wing tip parts with respect to the flow at the basic wing is counteracted according to the invention by the change in profile camber and additionally of the nose radius in connection for constant direction of zero lift. The theoretically induced drag at the wing and the total drag can be substantially decreased by the increase in aspect ratio. The saving in weight compared to a conventionally formed wing extension to the same aspect ratio amounts to about 75%. Design and manufacture of the wing of the invention require no additional expenditure as compared with known wings.

A further embodiment of the invention provides that the local zero lift direction of the wing tip parts remains constant from the junctional cross-sections between the basic wing parts and the wing tip parts. Such a design avoids increasing the induced drag for a given lift in the region of the wing tip parts.

Because of the special design by which the wing tip parts enclose an angle of about 45° by their junction cross-sections to the basic wing parts and the associated leading edge, a reduction in the induced drag is obtained compared to conventionally designed wing tip parts.

A further advantageous embodiment of the main concept of the invention resides in the increase in the radius of the profile nose of the wing tip parts corresponding to the increase of the profile camber of these parts. As shown by research, the flow separation in the range of large angles of attack begins at the outermost section of the wing tip parts. The special design of the profile nose and profile camber of the wing tip parts allows extending the range of flow applied to these parts up to relatively high angles of attack.

By mounting the wing tip parts to the basic wing parts in the sense of increasing the aspect ratio and by making the profiles of both kind of parts merge continuously into each other, both a simpler construction is obtained regarding the junction between basic wing part and wing tip part and a more favorable control of the flow as regards the separation behavior, on account of the continuous transition from one contour to the other.

Lastly, because the trailing edge of the wing tip parts is a rectilinear continuation of the trailing edge of the basic wing parts, a substantial saving in weight is achieved without thereby adversely affecting the lift behavior.

The drawings show one embodiment of the invention, which is described below.

FIG. 3 is a series of profile cross-sections along given spacings in the wing tip parts along lines $III_1$—$III_1$; $III_2$—$III_2$; and $III_3$—$III_3$.

Figure 2:
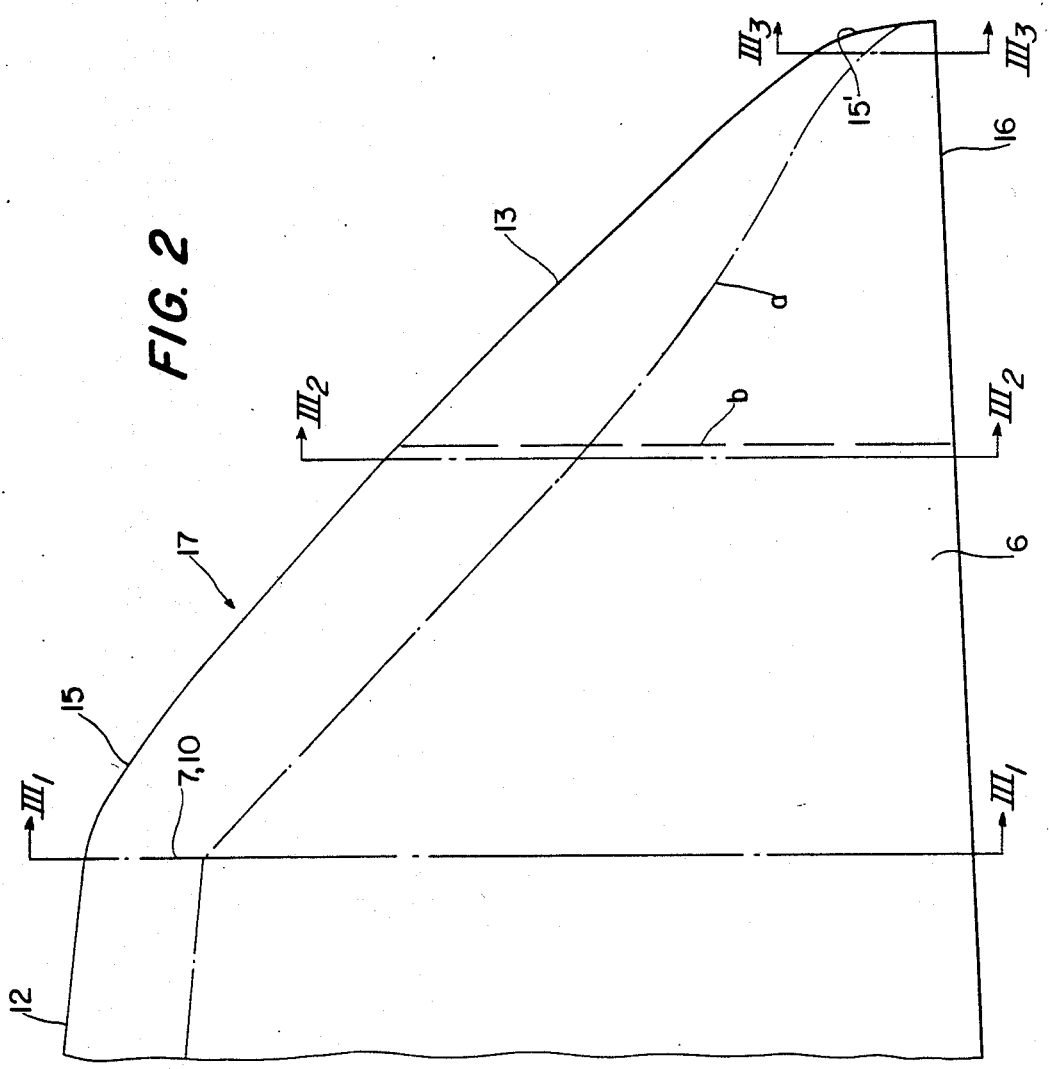
FIG. 2 is a top view on a much larger scale than FIG. 1 of one of the triangular wing tip parts.
Figure 1:
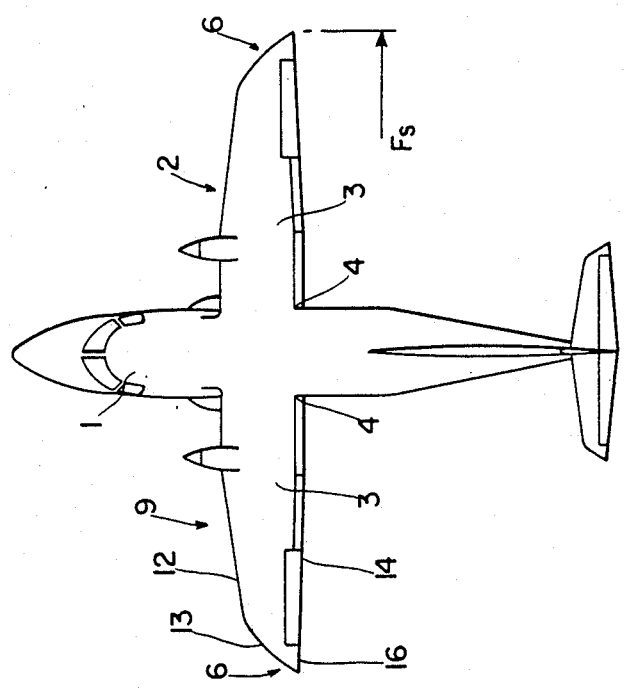
FIG. 1 is a top view of an aircraft with triangular wing tip parts.

FIGS. 1 through 3 show an aircraft wing 2, the wing halves 3 of which are mounted by means of the wing root 4 to the aircraft fuselage 1 in the manner of a high wing plane. The junction of the wing halves 3 to the plane fuselage is of conventional design.

The wing tip parts 6 are joined by the end ribs 7 to the basic wing parts 9 (FIG. 2) for the purpose of extending the wing span, the junctional cross-section 10 being vertical and orthogonal to the wing span Fs.

The leading edge 13 of the wing tip parts 6 sweeps back at an angle of about 45° starting from the leading edge 12 of the basic wing part 9 and merges by the transition arc 15' and 15 into the trailing edge 16 and the wing leading edge 12 respectively of basic wing part 9. It can thus be seen, that each of the basic wing parts 9, has a leading edge, which in relation to the wing span direction has an angle, that is significantly smaller than the 45° sweep back angle of the leading edge 13, of the respective connected wing tip part 6. Starting from the trailing edge 16 of the wing tip parts 6, the profiling, in extension of that of the overall wing 2, can extend in the direction of the wing tip as far as a terminal profile line "a" shown in dash-dot manner in FIG. 2. The wing upper and lower surface is respectively denoted by 20 and 21 in FIG. 3.

As indicated by the individual profile sections in FIG. 3, the profile camber and the nose radius r, r', r'' increase from the basic wing part 9 toward the wing tip, i.e., the profile camber, and nose radius increase. The increase in camber and nose radius applies in the direction of the wing span as far as a vertical cross-sectional plane b indicated in dash-dot manner in the direction of the chord. From this cross-sectional plane b, the profile camber and the relative nose radius r'' remain constant to the wing tip and the local zero lift direction is unchanged.

It will be obvious to those skilled in the art that many modifications may be made within the scope of the present invention without departing from the spirit thereof, and the invention includes all such modifications.

What is claimed is:
1. An aircraft wing comprising:
   a basic wing part, having a leading edge and a trailing edge and being essentially of unswept configuration;
   wing tip means for extending the span of the basic wing part so as to increase the aspect ratio as compared with a wing contoured as the basic wing part with similar wing area, the wing tip means being significantly shorter than the basic wing part, and being of triangular design with a swept back leading edge having an angled of about half a right angle in relation to the wing span direction, said angle being larger than an angle between the leading edge of the basic wing part and the direciton of the wing span, the wing tip means extending in span direction for about a chord length of the wing at the junction between the basic wing part and the wing tip means;
   the wing section camber of said wing tip means increasing at least over a portion of the extension thereof from the basic wing aprt to the tip of the triangular wing tip means; and
   the local zero lift direction of the wing tip means remaining constant beginning at the junction cross-section between the basic wing part and the wing tip means.

2. A wing according to claim 1 in which the radius of the profile nose of the wing tip means increases at least in part over the extension thereof in the span direction from the basic wing part.

3. A wing according to claim 2, in which the increase in the radius of the profile nose of the wing tip means corresponds to an increase in camber of the profile of said wing tip means.

4. A wing according to claim 1, in which the trailing edge of said wing tip means extends outwardly and rectilinearly as a continuation of the trailing edge of the basic wing part.

* * * * *